United States Patent [19]

Pounds

[11] Patent Number: 4,920,901
[45] Date of Patent: May 1, 1990

[54] DOUBLE DISC SEED DRILL WITH V-SHAPED FRAME

[75] Inventor: Rice H. Pounds, Monte Verde, Fla.

[73] Assignee: Pounds Motor Company, Inc., Winter Garden, Fla.

[21] Appl. No.: 224,713

[22] Filed: Jul. 27, 1988

[51] Int. Cl.$^5$ .............................................. A01C 5/06
[52] U.S. Cl. .................................. 111/164; 111/194; 111/926
[58] Field of Search ...................... 111/84, 85, 87, 88, 111/73, 80, 7, 66

[56] References Cited

U.S. PATENT DOCUMENTS

| | | | |
|---|---|---|---|
| 369,859 | 9/1887 | Johnson | 111/66 |
| 485,948 | 11/1892 | Kirkpatrick et al. | 111/84 |
| 486,343 | 11/1892 | Kirkpatrick | 111/85 |
| 522,329 | 7/1894 | Packham | 111/85 |
| 530,962 | 12/1894 | Packham | 111/85 |
| 591,354 | 10/1897 | Jones | 111/84 |
| 615,727 | 12/1898 | Mast | 111/85 |
| 702,402 | 6/1902 | Chaplin | 111/87 |
| 736,369 | 8/1903 | Dynes | 111/88 |
| 1,082,072 | 12/1913 | Davis | 111/85 |
| 2,106,901 | 2/1938 | Rassmann | 111/88 |
| 4,528,920 | 7/1985 | Neumeyer | 111/85 |

FOREIGN PATENT DOCUMENTS 590486 1/1960 Canada .................................. 111/87

OTHER PUBLICATIONS

John Deer-Van Brunt Fertilizer Grain Drill Manual Delivery Instructions, p. 10, 4/1956.

*Primary Examiner*—Danton D. DeMille
*Attorney, Agent, or Firm*—James H. Beusse

[57] ABSTRACT

A seeding apparatus is provided which includes a V-shaped frame having forward and rear arms of which the forward arm is hitchable to a tractor or other vehicle for pulling such apparatus. The seeding apparatus includes a carriage assembly which supports a furrow opener at one end of the carriage assembly adjacent the V-shaped frame. The seeding apparatus further includes a furrow closer at the remaining end of the carriage assembly. The carriage assembly is coupled to the rear arm of the frame by a spring mechanism which downwardly biases the furrow opener and closer toward the soil when the furrow opener and closer are in contact with the same. A second dual spring mechanism is situated between the hitch and the forward arm of the frame to further bias the furrow opener and closer downwardly when the furrow opener and closer contact the soil.

4 Claims, 3 Drawing Sheets

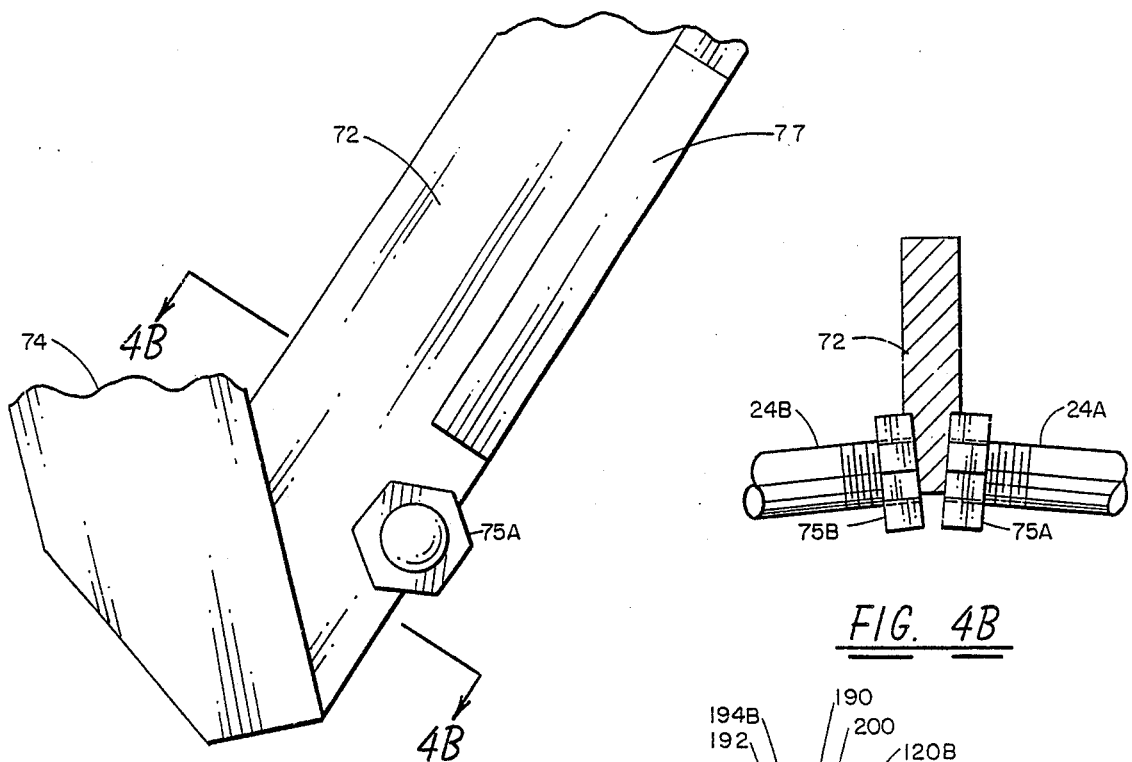
FIG. 4A
FIG. 4B
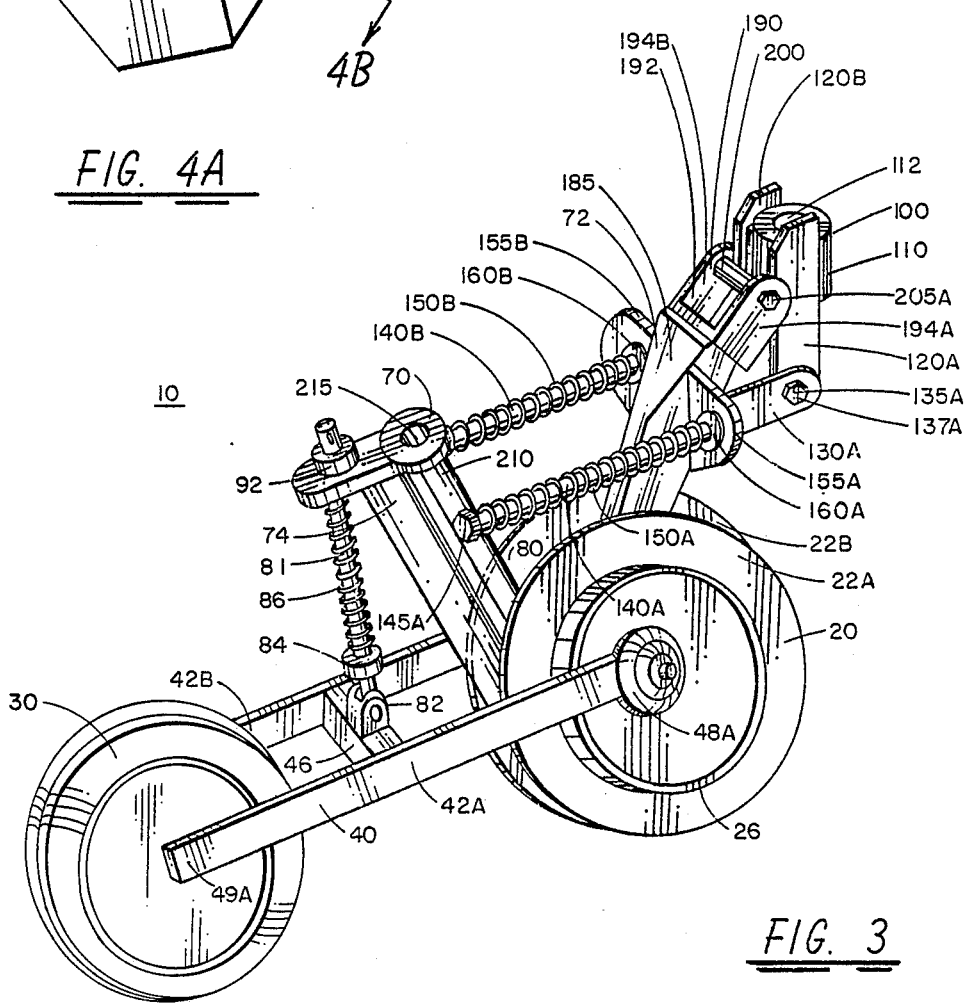
FIG. 3

DOUBLE DISC SEED DRILL WITH V-SHAPED FRAME

BACKGROUND OF THE INVENTION

This invention relates in general to agricultural implements and more particularly to apparatus for tillage, furrow opening, seeding and furrow closure.

In several farming areas, so called "till and drill" implements are used to both open a furrow in the soil and to plant small grains such as wheat, oats or rye in a single operation. In this manner, the time required for planting and the fuel consumed in the same are substantially reduced. From an efficiency standpoint, it is desirable to combine as many operations as possible in a single pass of the agricultural implement over the soil. Furthermore, it is desirable to construct a till and drill apparatus which can withstand mechanical shock transmitted from uneven and variable texture soil without early failure and deterioration.

BRIEF SUMMARY OF THE INVENTION

Accordingly, one object of the present invention is to provide an agricultural implement which efficiency opens a furrow in the soil, deposits seeds in the furrow and subsequently closes the furrow over the seeds in one operation or pass over the soil with a minimum of bouncing.

Another object of the present invention is to provide an agricultural implement which exhibits substantial structural integrity for withstanding mechanical shock transmitted from uneven and variable texture soil.

In accordance with the present invention, a seeding apparatus is provided which is adapted to be pulled by a tractor over the soil. The apparatus includes a substantially V-shaped frame having forward and rear frame members each having upper and lower opposed ends. The lower ends of the forward and rear frame members are connected at a vertex to form the V-shaped frame. The apparatus further includes a hitch, situated adjacent the upper end of the forward frame member, for hitching the apparatus to a tractor to permit pulling the apparatus over the soil. A carriage assembly having first and second opposed ends is included in the apparatus. A furrow opener is rotatably mounted at the first end of the carriage assembly and a furrow closer is rotatably mounted at the second end of the carriage assembly. The carriage assembly includes a middle portion between the opposed ends thereof. The carriage assembly is configured such that the furrow opener is situated adjacent the vertex. The apparatus further includes a first spring structure for connecting the upper end of the rear frame member to the middle portion of the carriage assembly and for biasing the furrow opener and the furrow closer toward the soil as the seeding apparatus is moved over the soil. A second spring structure is connected between the hitch and the forward frame member for biasing the furrow opener and the furrow closer toward the soil as the seeding apparatus is moved over the soil. A seed conveyor is situated adjacent the rear frame member such that seeds may be deposited in the soil after the furrow opener opens a furrow in the soil.

The features of the invention believed to be novel are specifically set forth in the appended claims. However, the invention itself, both as to its structure and method of operation, may best be understood by referring to the following description and accompanying drawings.

BRIEF DESCRIPTION OF THE DRAWINGS

FIG. 3 is a side perspective view of the seeding apparatus of the present invention.

FIG. 4A and 4B illustrate a method of attaching discs to a frame member.

DETAILED DESCRIPTION OF THE INVENTION

Figure 1:
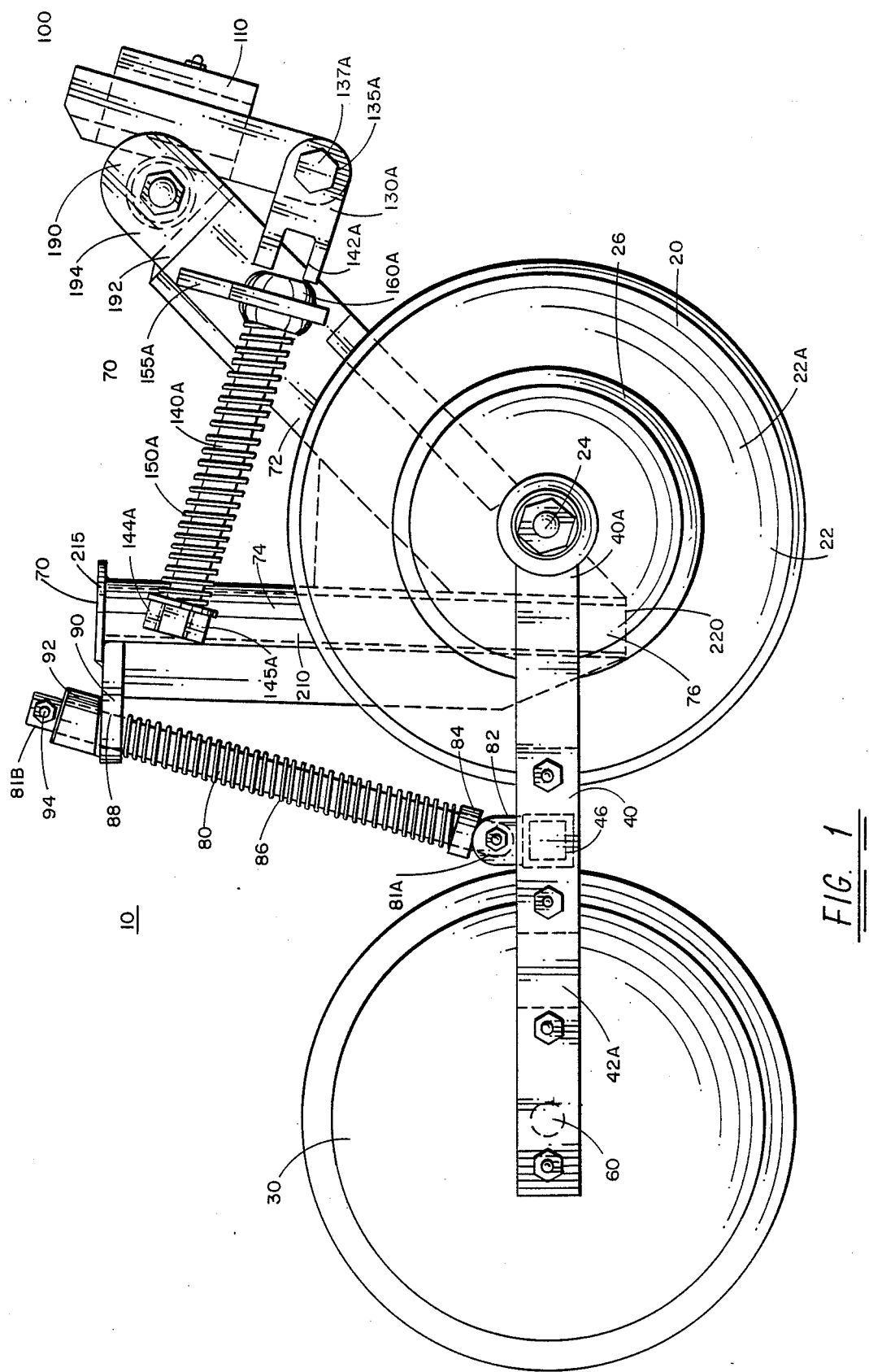
FIG. 1 is a side view of the seeding apparatus of the present invention.

FIG. 1 shows a side view of seeding apparatus 10 of the present invention. Seeding apparatus 10 includes a furrow opener 20 and a furrow closer 30. Furrow opener 20 includes a pair of substantially circular discs 22A and 22B of which disc 22A is visible in FIG. 1. Disc 22B is visible in the front view of apparatus 10 shown in FIG. 2. For reference, a center line 23 defines a plane through the center of apparatus 10 and divides apparatus 10 into a right side and a left side. The left side of apparatus 10 is depicted in FIG. 1. Generally, those portions of apparatus 10 on the right side thereof are substantially symmetric about center line 23 with respect to the portions of apparatus 10 on the left side thereof. With respect to furrow opener 20, those portions on the left side thereof are designated by numbers having an "A" suffix and those corresponding portions of furrow opener 20 on the right side thereof are designated with the same number having a "B" suffix.

Figure 2:
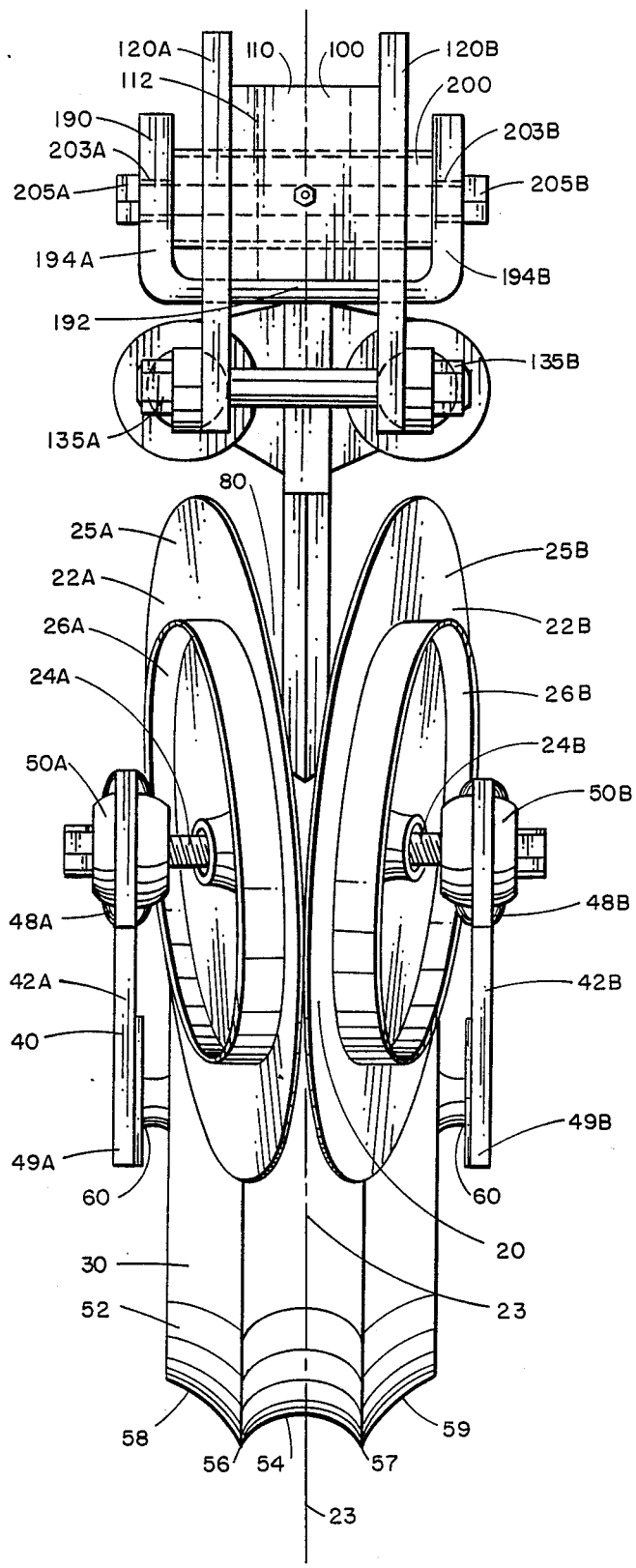
FIG. 2 is a front view of the seeding apparatus of the present invention as viewed from the direction in which the apparatus is pulled.

As seen in FIG. 2, discs 22A and 22B are canted toward each other at an acute angle so as to open a furrow in the soil when furrow opener 20 is dragged along the surface of the soil. Discs 22A and 22B are mounted on independent axles 24A and 24B, respectively. Axles 24A and 24B are non-coaxial and are themselves angled to permit discs 22A and 22B to be canted as described above.

Discs 22A and 22B each include outer surfaces 25A and 25B upon which furrow depth control members 26A and 26B are respectively situated. For example, in one embodiment of the invention, member 26A is a circular raised portion or a thin cylinder disposed on disc surface 25A at a predetermined distance from the outer edge of disc 22A. In this manner, disc 22A is not permitted to penetrate the soil more than such predetermined distance from the edge of disc 22A since member 26A has a sufficient width that it will ride on the top of the soil. In this manner, furrows are kept from becoming undesirably deep.

Returning again to FIG. 1, it is seen that seeding apparatus 10 includes a carriage assembly 40 including a pair of mounting bars 42A and 42B which are situated parallel with respect to each other. Mounting bars 42A and 42B are spaced apart by a sufficient distance to accommodate furrow opener 20 and furrow closer 30 therebetween as seen more clearly in the side perspective view of FIG. 3. Mounting bars 42A and 42B are fixedly held in such spaced apart relationship by a connecting bar 46, shown in broken line in FIG. 1 and more clearly in FIG. 3. Connecting bar 46 connects mounting bar 42A to mounting bar 42B substantially at or adjacent to the middle region of carriage assembly 40. The middle region of carriage assembly 40 is defined to be the region of carriage assembly 40 located approximately adjacent to the midpoint thereof between furrow opener 20 and furrow closer 30. For clarity, connecting bar 46 is omitted in FIG. 2.

Referring now to FIG. 2, mounting bar 42A includes opposed ends 48A and 49A. Similarly, mounting bar 42B includes opposed ends 48B and 49B. Axles 24A and 24B are mounted near adjacent ends 48A and 49A, respectively. More specifically, axles 24A and 24B are angularly mounted with respect to mounting bars 42A and 42B so as to orient discs 22A and 22B in the already described canted relationship. Bearing assemblies 50A and 50B or other means are provided adjacent bar ends 48A and 49A to permit discs 22A and 22B to rotate with respect to mounting bars 42A and 42B.

Furrow closer 30 is mounted adjacent the remaining ends 49A and 49B of mounting bars 42A and 42B. More specifically, as seen in FIGS. 1 and 3, but most clearly FIG. 2, furrow closer 30 is shaped in the form of a wheel exhibiting a dual ridge structure. That is, furrow closer 30 includes a generally circular rim 52 having a raised central concave portion 54 with ridges 56 and 57 formed on each side thereof. Rim 52 includes sloping surfaces 58 and 59 which slope away from ridges 56 and 57, respectively, such that ridges 56 and 57 are raised with respect to the remainder of rim 52 of furrow closer 30. This dual ridge rim geometric arrangement facilitates the closing of the furrow created by furrow opener 20 when apparatus 10 is pulled over the soil. It is noted that furrow close 30 is rotatably mounted on a shaft 60 between mounting bar ends 49A and 49B as shown in FIG. 2.

Seeding apparatus 10 further includes a substantially V-shaped frame 70 as seen in FIG. 1 and FIG. 3. Frame 70 includes forward frame member 72 and rear frame member 74 which are configured in the aforementioned V-shape so as to form a vertex 76 where frame members 72 and 74 meet as shown in FIG. 1. It is noted that frame vertex 76 and a substantial portion of V-shaped frame 70 are situated in the open region 80 formed between the inner surfaces of discs 22A and 22B as indicated in FIG. 3. The axles 24A and 24B are attached to frame member 72.

Turning briefly to FIGS. 4A and 4B, that portion of the frame members 72 and 74 occluded by the disc 22A can be better seen. In FIG. 4A, there is shown a large nut 75A welded to the near side of the frame member 72. An identical nut 75B is welded to the far side of member 72. However, it is noted that one of the nuts 75A, 75B is a right-hand thread while the other is a left-hand thread. The thread pattern is selected to cause the axles 24A, 24B, which are threadedly engaged in nuts 75, to tighten while the implement is in normal use. FIG. 4B is a cross-section taken long the line 4B—4B of FIG. 4A and shows how the nuts 75 are canted to effect the angular orientation of the axles 24A, 24B. It should also be noted that the frame member 72 includes a tapered or knife-edge section 77 which serves to break up dirt clods and prevent accumulation within the discs 22. The discs 22 are mounted on axles 24 by means of conventional pressed bearings.

As seen in FIG. 1, apparatus 10 includes a cylindrical shaft or bar 81 having opposed ends 81A and 81B. Bar end 81A is pivotally mounted to a pivot structure 82 which is connected to carriage assembly 40. Pivot structure 82 is situated in the middle region of carriage assembly 40 between furrow opener 20 and furrow closer 30. For example, in the present embodiment of the invention, pivot structure 82 is conveniently connected to connecting bar 46 which connects bar 42A to bar 42B. A ring-like spring retaining member 84 somewhat wider than the width of bar 81, is situated adjacent end 81A thereof as shown in FIG. 1. A spring 86 having a diameter somewhat wider than the width of bar 81 is situated over bar 81 with one end of spring 86 being in contact with spring retaining member 84. The remaining end 81B of bar 81 is passed through an aperture 88 in a journal 90 extending from the upper end of rear frame member 74. Bar 81 is slidable within aperture 88. A retaining member 92 is situated adjacent bar end 81B to provide a stop beyond which bar end 81B may not be further downwardly pulled. Spring 86 is appropriately dimensioned such that when apparatus 10 is lowered toward the soil, spring 86 is placed in compression as furrow closer 20 contacts the soil and moves upwardly with respect to the upper end of rear frame member 74. This action will be discussed later in more detail. A bolt 94 is used to keep retaining member 92 in position on bar 81. It will be appreciated that the bar end 81B could terminate in a ball joint at journal 90 rather than sliding through aperture 88.

Referring now to FIG. 1 in conjunction with FIGS. 2 and 3, it is seen that apparatus 10 further includes a hitch 100. Hitch 100 includes a coupling member 110 for coupling hitch 100 to some means of pulling apparatus 10, for example, a tractor. More specifically, coupling member 110 includes an aperture 112 for receiving a standard coupling pin (not shown) for coupling hitch 100 to a tractor or the like. Hitch 100 includes side plate structures 120A and 120B which are mounted parallel with respect to each other. Although side plate 120B is obscured in FIG. 1, side plate 120A is clearly shown therein. Such side plate 120B is in fact in a substantially mirror image relationship with respect to side plate 120A and spaced apart therefrom by a predetermined distance.

The lowermost portion of side plate 120A has a shaft receiving member 130A pivotally coupled thereto at pivot point 135A. For example, the lowermost portion of side plate 120A and shaft receiving member 130A include respective apertures (not shown) through which a bolt 137A is suitably mounted and secured to provide the above mentioned pivoting capability. The remaining end of shaft receiving member 130A is fixedly mounted to a shaft 140A as seen in FIG. 1. More specifically, shaft 140A includes opposed ends 142A and 144A. Shaft end 142A is fixedly mounted in shaft receiving member 130A as shown in FIG. 1. A spring retaining member 145A is situated at remaining end 144A of shaft 140A. Spring retaining member 145A is appropriately shaped and dimensioned to retain a spring 150A which is situated on shaft 140A as shown in FIG. 1. For example, a nut is conveniently threaded onto shaft end 144A to retain spring 150A and prevent the same from moving past end 144A when such spring is compressed.

A shaft support member 155A is situated on forward frame member 72 extending downwardly from the uppermost end thereof as shown in FIG. 1. Support member 155A is situated substantially perpendicular to forward frame support member 72. The lowermost portion of shaft support member 155A includes an aperture (not visible in FIG. 1) in which a bushing 160A is situated so as to permit shaft 140 to substantially freely move through such aperture and bushing 160A. Bushing 160A acts as a retaining member for the end of spring 150A adjacent shaft end 142A. In this manner, as furrow opener 20 comes in contact with the soil (or moves upward due to a surface variation in the soil), spring 150A becomes further compressed so as to exert additional force on frame member 72 thus tending to push furrow opener 20 into the ground.

As shown more clearly in the perspective view of FIG. 3, the right side of frame 72 opposite the left side shown in FIG. 1 includes a side plate 120B, a shaft receiving member 130B (not shown), shaft 140B, spring retaining member 145B (not shown), spring 150B, shaft support member 155B and bushing 160B which are substantially symmetrical with respect to the corresponding components discussed above and similarly numbered.

The uppermost portion of forward frame member 72 flares outwardly to form a triangularly shaped flared portion 185 as seen in FIG. 3. The aforementioned shaft support members 155A and 155B are disposed on the opposite sides of flared portion 185. Returning again to FIG. 2, a substantially U-shaped bracket 190 is fixedly attached or alternatively is formed as an integral part of the uppermost portion of forward frame member 72. That is, bracket 190 includes a lower portion 192 and side arm portions 194A and 194B. A hollow cylinder 200 is rotatably mounted between the upper ends of side arm portions 194A and 194B as shown in FIGS. 2 and 3. That is, cylinder 200 is welded or otherwise fixedly attached to coupling member 110 of hitch 100. As seen in FIG. 2, side arm portions 194A and 194B includes respective apertures 203A and 203B situated at opposite ends of cylinder 200. A shaft 205 is positioned such that it enters side arm portion 194A and extends through aperture 203A, the hollow center region of cylinder 200 and through aperture 203B where it exits side arm portion 194B. The opposed ends of shaft 205 are threaded and obscured from view by nuts 205A and 205B which hold shaft 205 in position. In this manner, frame member 72 of frame 70 is permitted to pivot relatively freely about shaft 205 while cylinder 200 remains attached to hitch 100 as visualized more clearly while referring again to the perspective view of FIG. 3.

Apparatus 10 includes a seed conveyor tube 210 having an upper opening 215 and a lower opening 220 as seen in FIG. 3 and more clearly in FIG. 1. Seeds are provided to opening 215 and flow downwardly through tube 210 where they are dispensed at opening 220. Tube 210 is situated such that lower opening 220 is between furrow opener 20 and furrow closer 30. In one embodiment of the invention, tube 210 is positioned such that lower opening 220 is located between discs 22A and 22B at or adjacent vertex 76. In this manner, seeds are deposited in the furrow created by discs 22A and 22B passing along the ground immediately after such furrow is created. In the present embodiment of the invention, seed conveyor tube 210 is formed as an integral part of rear frame member 74 such that upper opening 215 and lower opening 220 are situated at the upper and lower ends of rear frame member 74.

The operation of seeding apparatus 10 is now briefly summarized. Apparatus 10 is hitched to a tractor or other pulling apparatus via hitch 100 by placing a connecting pin through hitch aperture 112 and a conventional coupler structure on the tractor. Tractors are generally outfitted with hydraulic devices for raising and lowering agricultural apparatus which are hitched thereto. Although the invention may be employed with a tractor which does not employ such a raising and lowering apparatus, for purposes of understanding the operation of the invention, it is helpful to envision apparatus 10 as it is lowered from a raised position down onto the soil which is to be tilled and planted.

Referring now to FIGS. 1 and 3, when seeding apparatus 10 is lowered onto the soil, furrow closer 30 first contacts the soil. As apparatus 10 is lowered further, spring 86 compresses to provide a downward force on furrow closer 30. As apparatus 10 is lowered still further, furrow opener 20 contacts the soil and springs 150A and 150B compress to provide a downward force on furrow opener 30.

As seeding apparatus 10 is pulled along the ground, furrow opener 20 creates a furrow. That is, the dual canted discs 22A and 22B push soil to either side as the discs are pulled along and contact the soil. Seeds are provided to seed tube 210 and are dispensed from tube end 220 into the newly created furrow. The furrow closer 30 then closes the furrow over the just planted seeds.

As seeding apparatus 10 is pulled over and in contact with the soil, variations in the surface of the soil are encountered. That is, the soil exhibits high points and low points often close to one another. When such surface variations are encountered, spring 86 acts to provide a relatively constant downward force on furrow closer 30. This tends to provide a more uniform furrow closing action to the soil. Also, under such variable soil level conditions, springs 150A and 150B act to provide a relatively constant downward force on the furrow opener 20 despite such surface variations. In this manner, the furrow created by apparatus 10 exhibits a relatively constant depth. Such spring forces also aid furrow closer 30 in more uniformly closing the furrow over the deposited seeds despite such ground surface variations.

The foregoing describes an apparatus for opening a furrow in soil, seeding the furrow thus opened, and for closing the furrow after seeding, all in a single pass over the soil by the apparatus. The seeding apparatus exhibits substantial structural integrity.

While only certain preferred features of the invention have been shown by way of illustration, many modifications and changes will occur to those skilled in the art. For example, it will be appreciated that a plurality of the above described seeding devices may be conveniently ganged to seed several rows of seeds simultaneously in parallel. It is, therefore, to be understood that the present claims are intended to cover all such modifications and changes which fall within the true spirit of the invention.

I claim:

1. A double disc seed drill comprising:
    a substantially V-shaped frame comprising a forward frame member and a rear frame member, each frame member having an upper end and a lower end, said lower end of each of said frame members being fixedly connected to each other to create a vertex of said V-shaped frame, and a cross-member interconnected between said forward and said rear frame members for provided further structural support between said members;
    hitching means for coupling said upper end of said forward frame member to a pulling apparatus said hitching means including a pair of vertically oriented side plates and a coupling member, said coupling member having fixedly attached on opposite sides thereof said side plates, each said side plate terminating in a shaft receiving member, each shaft receiving member having corresponding aligned apertures for passing a pivot bolt therethrough, said upper end of said forward member having a U-shaped bracket, the legs of which have an aperture alignable with each other for passing an axle member therethrough for pivotably coupling said frame to said coupling member;

first and second axles attached to opposite sides of said frame adjacent said vertex, each of said axles being angularly oriented with respect to a line normal to a standard direction of motion of said frame when the drill is in use;

first and second discs mounted on respective ones of said first and second axles, said discs including axle holes for receiving said axles such that said discs are aligned in planes normal to the orientation of a corresponding one of said axles whereby, during use of the drill, leading edges of said discs are substantially in contact and trailing edges of said discs are spaced apart a preselected distance;

first biasing means for pressuring said frame and said connected discs downward during use of the drill, said biasing means comprising first and second shaft support members fixedly attached to respective opposite sides of said forward frame member adjacent said upper end thereof, each of said support members extending substantially perpendicularly outward of said forward frame member and having at least one aperture adjacent respective outer ends thereof, first and second shafts extending through corresponding ones of said apertures in said support members and being connected at one end thereof to said shaft receiving member, first and second helical springs encircling corresponding ones of said first and second shafts between said support members and a free end of said shafts opposite said one end thereof, means coupled to each of said free ends of said shafts for compressing the springs against said support members whereby said forward frame member is pivotably biased about said axle member to force said discs downward;

a carriage assembly comprising an H-shaped frame member having a leading end and a trailing end and a mid-support cross-member, said leading end being pivotably attached at said first and second axles to said V-shaped frame, said trailing end including a wheel axle connected thereto;

a rolling furrow closer mounted on said wheel axle and aligned to track said discs when the drill is in use; and second biasing means connected for biasing said furrow closer downward with respect to said V-shaped frame, said second biasing means comprising a third shaft having a first end pivotably connected to said cross-member of said carriage assembly, a third support member extending in substantially a horizontal plane from said upper end of said rear frame member of said V-shaped frame, said third support member including an aperture for passing said third shaft therethrough, and a third helical spring encircling said third shaft between said first end thereof and said third support for biasing said carriage assembly downward with respect to said third support, and means connected to an end of said third shaft opposite said first end for preventing withdrawal of said third shaft from said aperture when said drill is lifted vertically.

2. The seeding apparatus of claim 1 including a soil depth penetration limiting means situated on at least one of the first and second discs of the furrow opener.

3. The seeding apparatus of claim 2 wherein said first and second discs include respective outer surfaces facing away from each other, said first and second discs having peripheral edges, and wherein said limiting means includes a circularly-shaped raised portion situated a predetermined distance from the peripheral edge of one of said first and second discs and on the outer surface of such disc.

4. The seeding apparatus of claim 1 wherein said furrow closer includes a wheel having a circular rim, said rim having two spaced apart ridges extending around the circumference of said rim for aiding in closing a furrow opened by said furrow opener.

* * * * *